US005111023A

United States Patent [19]

Horibe et al.

[11] Patent Number: 5,111,023

[45] Date of Patent: May 5, 1992

[54] METHOD OF TREATING GOLD PLATING FILM

[75] Inventors: Kinya Horibe; Tomio Hirano; Minoru Ikeda; Hideaki Murata, all of Shizuoka, Japan

[73] Assignee: Yazaki Corporation, Japan

[21] Appl. No.: 557,105

[22] Filed: Jul. 25, 1990

[30] Foreign Application Priority Data

Jul. 31, 1989 [JP] Japan ................................. 1-196933

[51] Int. Cl.$^5$ ................................................ B23K 26/00

[52] U.S. Cl. ............................ 219/121.85; 219/121.6; 219/121.66

[58] Field of Search ...................... 219/121.65, 121.66, 219/121.85, 121.16, 121.17, 121.35

[56] References Cited

U.S. PATENT DOCUMENTS

| | | | |
|---|---|---|---|
| 4,151,014 | 4/1979 | Charschang et al. | 148/13 |
| 4,495,255 | 1/1985 | Draper et al. | 428/669 |
| 4,724,015 | 2/1988 | Sato et al. | 148/121 |
| 4,832,798 | 5/1989 | Crijanovich et al. | 204/15 |

OTHER PUBLICATIONS

Patent Abstracts of Japan, vol. 10, No. 107, dated Apr. 22, 1986 (relevant to Japanese Patent Application 60-238,464 assigned to Furukawa Denki Kogyo KK).

Chemical Abstracts, vol. 80, No. 20, dated May 20, 1974 (relevant to *Metalloved, Term. Obrab. Metal.,* 1974).

"Der Laser in der Fertigungstechnik", by J. Steffen; Technische Rundschau, vol. 80, No. 37, dated Sep. 9, 1988, pp. 21-34.

*Primary Examiner*—C. L. Albritton

*Attorney, Agent, or Firm*—Wigman & Cohen

[57] ABSTRACT

To remove pores and lattice defects in gold film plated on a substrate, the gold plating film is irradiated with a first laser beam to bring at least the surface of the film into almost melted condition, and then cooled in air. Further, it is preferable to anneal the melted gold surface by a second laser beam weaker than the first laser beam before air cooling, thus reducing the thickness of the gold film and therefore the material cost of electric contacts, for instance.

8 Claims, 1 Drawing Sheet

TABLE 1

| | Au THICKNESS (μm) | MELTED Au THICKNESS (%) | ANNEAL | LUSTER (VISUAL) | CONTACT RESISTANCE (mΩ) | CORROSION TEST IN $SO_2$ (VISUAL) |
|---|---|---|---|---|---|---|
| EXAMPLE 1 | 0.5 | 33 | NO | B | 0.5 | B |
| EXAMPLE 2 | 0.5 | 100 | NO | B | 0.5 | B |
| EXAMPLE 3 | 0.5 | 100 | YES | B | 0.4 | A |
| COMPARISON 1 | 0.5 | 0 | NO | C | 0.8 | C |
| COMPARISON 2 | 2.5 | 0 | NO | C | 0.7 | B |

A: EXCELLENT
B: GOOD
C: POOR

METHOD OF TREATING GOLD PLATING FILM

BACKGROUND OF THE INVENTION

1. Field of the Invention

The present invention relates to a method of treating gold plating film, and more specifically to a method of treating a gold layer plated on electric contact material for instance, so that the thickness of the gold plating layer can be reduced without deteriorating the contact resistance and durability thereof.

2. Description of the Prior Art

Electric contacts are widely used in various industrial fields, and the surface of the electric contact is usually plated with a noble metal, in particular with gold to improve the surface stability and durability of the contact, because gold is low in contact resistance and high in corrosion resistance.

In almost all the gold plating film, however, since there are minute defects such as pores, where the film thickness is thin, the upper surface of the gold film communicates with the lower surface thereof (referred to as pinholes). Therefore, when the gold film is exposed within a corrosive environment, there exists a problem in that a local battery corrosion phenomenon is produced between a substrate metal (nickel plating layer, in usual) and the gold plating layer, so that there exists a phenomenon such that corrosion product or substance of the substrate is precipitated from the surface thereof, thus resulting in an increase in the contact resistance of the electric contact. Conventionally, therefore, it has been necessary to cover the surface of the contact with a relatively-thick gold plating film, in order to eliminate the minute pores within the film as small as possible or to prevent the gold film deterioration.

Experiments have indicated that a sufficient thickness of the gold film is about 0.5 μm when only the contact resistance and abrasion resistance are taken into account. In practice, however, since the thickness of gold plating film lies from 2.0 to 2.5 μm under due consideration of the above-mentioned local battery corrosion caused by the presence of pores, there exists a problem in that the cost of the contact material inevitably increases.

In addition, where there exist a great number of lattice defects in the gold plating film, since corrosion grows beginning from these lattice defects, the durability of the contact parts is further deteriorated by the lattice defects.

SUMMARY OF THE INVENTION

With these problems in mind, therefore, it is the primary object of the present invention to provide a method of treating gold plating film so that the thickness of a gold film can be minimized by eliminating minute pores and also lattice defects, without deteriorating the contact characteristics.

To achieve the above-mentioned object, the method of treating a gold plating film, according to the present invention, comprises the steps of: (a) exposing the gold plating film to a first irradiation energy to bring at least surface portion of the film into almost melted condition; and (b) cooling the melted film gradually in air. Further, it is preferable to further exposing the almost melted film to a second irradiation energy weaker than the first irradiation energy to anneal the almost melted film, before cooling the melted film gradually in air. The first and .second irradiation energy is electron or laser beam energy. The intensity of the second irradiation energy is about $\frac{2}{3}$ times of that of the first irradiation energy.

In the gold plating film treating method according to the present invention, since at least the surface portion (e.g. t/3) of the gold film is melted or almost melted, it is possible to eliminate minute pores within the gold film and the resulting pinholes. Further, when the melted gold film is further annealed, it is possible to minimize the presence of lattice defects within the gold film. Therefore, it is possible to markedly reduce the thickness of the gold plating film. In the case of electric contacts, for instance, the thickness of the gold plating film can be reduced down to about 0.5 μm without deteriorating contact characteristics, as compared with the 2.0 to 2.5 μm thick prior-art gold film plated on a contact substrate material.

DETAILED DESCRIPTION OF THE PREFERRED EMBODIMENTS

Figures 1, 2:
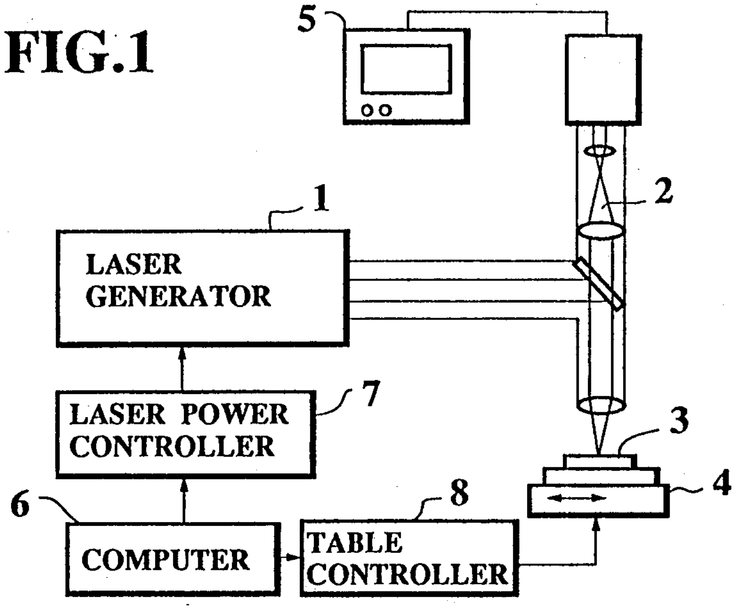
FIG. 1 is a schematic block diagram showing an example of a laser irradiating apparatus used for realizing the method of the present invention.
FIG. 2 is a table listing the relationship between gold thickness, laser melted gold layer thickness, presence or absence of laser annealing, and contact characteristics, in comparison between invention examples and comparative examples.

The feature of the method according to the present invention is to irradiate a gold plating film formed by electroless or electric plating method with a laser or electron beam in order to bring at least the surface portion of the gold film into a melted or almost melted condition. The melted gold is then cooled in air for recrystallization, to eliminate minute pores inevitably produced within the gold plating film. Further, it is preferable to irradiate the melted gold film with another weaker laser or electron beam before air cooling in order to anneal the melted gold to eliminate lattice defects.

Although an electron beam can be also adopted as the irradiation energy, however, the laser beam widely used in various machine tool and medical fields is easy to handle and control. Therefore, an appropriate laser beam generator is irradiated upon the gold plating film according to the shapes of the contact parts.

In more detail, since the focus of a laser beam can be easily adjusted and the waveform of a laser beam can be easily controlled to a continuous (DC) or pulse laser beam, it is possible to simply determine appropriate irradiation energy conditions on the basis of preliminary experiments.

The most effective irradiation method of achieving the object of the present invention is to irradiate the gold film surface twice by a two-step irradiating method. That is, the laser is irradiated upon the gold film surface continuously or continually until at least the film surface portion is melted or almost melted, and thereafter the irradiation energy intensity is reduced for annealing process in order to reduce not only the minute pores penetrating through the film surface but also the lattice defects markedly.

On the basis of the above-mentioned method, it is possible to provide a sufficiently high durable contact parts having a relatively thin thickness of gold film enough to satisfy the contact characteristics.

In the treating method of the present invention, since the gold plating film is first irradiated with a laser beam into a state where at least the film surface is melted or almost melted, it is possible to eliminate minute pores within the film and pinholes exposed to the film surface. In addition, since the melted surface is cooled gradually by subsequently irradiating the melted surface with a relatively weak irradiation energy, it is possible to minimize the occurrence of internal lattice defects.

EXAMPLES

Test samples, a laser generator, test method, and accelerated corrosion test method will be described in detail hereinbelow.

Table 1 lists average test results of five samples of each Example. In the Table, Comparative Examples (non-irradiated sample and a thick-film gold plating sample) are also listed together for comparison.

Samples

An inner nickel film having a thickness of about 1.0 μm was formed on a base (substrate) material by chemical plating, and further a gold plating film having a thickness of 0.5 μm was formed on the inner nickel film by electrolytic plating.

Test laser generator:

A YAG (yttrium-aluminium-garnet) laser was used. The maximum radiative energy was 400 W; the pulse irradiation time was adjustable from 0.5 ms to a continuous state; and the pulse frequency was controllable within a range between 0.2 and 500 Hz.

With reference to FIG. 1, the laser irradiatinq apparatus comprises a laser generator 1, an optical device 2 for guiding a laser beam to a test sample 3 mounted on a movable table 4 and a monitor TV screen 5, a computer 6 for controlling the laser beam generator 1 via a laser power controller 7 and also the movable table 4 via a table controller 8. Therefore, when laser irradiation conditions such as laser power, laser waveform, laser irradiation frequency, laser irradiation time, the table shifting speed, etc. are previously programmed according to the thickness and shape of electric contacts and loaded into the computer 6, it is possible to automatically melt and anneal the gold plating film coated an electric contact parts at the end of the automatic gold plating process.

Contact test method:

Contact resistance was measured by bringing a gold pin having an end radius of curvature of 0.5 mm into pressure contact with the test samples under a contact load of 100 gf. The measured results were average values at ten different locations.

Accelerated corrosion test:

Samples were kept for 8 hours within a corrosive air atmosphere having a sulfur dioxide concentration (density) of 1000 ppm, at 90% (relative humidity) and 40° C. Further, the other portions of the sample not covered by gold plating was coated with a protective paint.

EXAMPLE 1

The samples were irradiated for 20 ms with a laser beam at a power of 3.0 W/cm$^2$ (on the sample surface) and a frequency of 10 Hz, by shifting the laser beam at a speed of 1 mm. Thereafter, the samples were cooled in air. Under these conditions, about $\frac{1}{3}$ in thickness of the gold film was almost melted.

EXAMPLE 2

The samples were irradiated with a laser beam at a power of 5.0 W/cm$^2$ in the same conditions as in Example 1. Under these conditions, almost all of the gold film was melted, and cooled in air.

EXAMPLE 3

The samples were irradiated with the same laser beam as in Example 2 to melt almost all of the gold film. Thereafter, the laser power was reduced down to $\frac{2}{3}$ of the initial intensity to further anneal the sample film surfaces. Thereafter, the samples were cooled in air.

Table 1 indicates that the annealing effect (Example 3) is extinguishable from Examples 1 and 2. Further, the 0.5 μm-thick gold plating films treated in accordance with the present invention (Examples 1 to 3) correspond in corrosion test to the 2.5 μm-thick prior-art gold plating film (Comparative example 2).

According to the present invention, it is possible to obtain a high reliability almost equal to that of gold-clad contact parts, in spite of the fact that the thickness of the gold plating film is reduced markedly, thus resulting in prevention of the wast of resources or reducing the cost of contact parts.

Further, in the present invention, since the treating time is short and a simple laser generator can be used, it is possible to provide the irradiation treatment according to the present invention for the contact parts, after gold plating processing along an automatic gold plating manufacturing line, thus it being possible to increase the contact parts productivity.

What is claimed is:

1. A method of treating a gold plating film, comprising the steps of:

(a) exposing the gold plating film to a first irradiation energy to bring at least surface portions of the film into almost melted condition; and (b) cooling the almost melted portions gradually in air.

2. The method of claim 1, which further comprises the step of exposing the almost melted portions to a second irradiation energy weaker than the first irradiation energy to anneal the almost melted portions before cooling the almost melted portions gradually in air.

3. The method of claim 2, wherein the first and second irradiation energy is laser beam energy.

4. The method of claim 2, wherein the first and second irradiation energy is electron beam energy.

5. The method of claim 2, wherein intensity of the second irradiation energy is approximately $\frac{2}{3}$ times that of the first irradiation energy.

6. The method of claim 1, wherein the thickness of the gold plating film is about 0.5 lm.

7. The method of claim 1, wherein at least $\frac{1}{3}$ of the gold plating film thickness is brought into the almost melted condition.

8. The method of claim 1, wherein the gold plating film is plated on a substrate material of an electrical contact.

* * * * *